United States Patent
Ishigaki et al.

(10) Patent No.: US 10,052,717 B2
(45) Date of Patent: Aug. 21, 2018

(54) UNDERWATER WELDING APPARATUS AND UNDERWATER WELDING METHOD

(75) Inventors: Tatsuya Ishigaki, Kanagawa (JP);
Takuya Uehara, Kanagawa (JP);
Yoshio Hamamoto, Kanagawa (JP);
Osamu Yamaguchi, Kanagawa (JP);
Takeshi Maehara, Kanagawa (JP);
Hiromi Kato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 362 days.

(21) Appl. No.: 14/131,119

(22) PCT Filed: Aug. 22, 2012

(86) PCT No.: PCT/JP2012/005261
§ 371 (c)(1),
(2), (4) Date: Apr. 30, 2014

(87) PCT Pub. No.: WO2013/027398
PCT Pub. Date: Feb. 28, 2013

(65) Prior Publication Data
US 2014/0231394 A1   Aug. 21, 2014

(30) Foreign Application Priority Data
Aug. 24, 2011 (JP) .................................. 2011-182238

(51) Int. Cl.
*B23K 9/00* (2006.01)
*B23K 26/00* (2014.01)
*B23K 26/12* (2014.01)

(52) U.S. Cl.
CPC ........ *B23K 26/123* (2013.01); *B23K 26/1224* (2015.10)

(58) Field of Classification Search
CPC ................ B23K 26/122; B23K 26/123; B23K 26/1435–26/1437; B23K 26/16; B23K 26/20; B23K 26/21
(Continued)

(56) References Cited

U.S. PATENT DOCUMENTS 3,118,468 A * 1/1964 Bochan .................. F16K 15/147
137/846
3,632,950 A * 1/1972 Berghof ............... B23K 9/0061
219/72

(Continued)

FOREIGN PATENT DOCUMENTS

FR   2 031 728    11/1990
JP   52 108352    9/1977
(Continued)

OTHER PUBLICATIONS

International Search Report dated Oct. 23, 2012 in PCT/JP12/005261 Filed Aug. 22, 2012.
(Continued)

*Primary Examiner* — Ibrahime A Abraham
*Assistant Examiner* — Gyounghyun Bae
(74) *Attorney, Agent, or Firm* — Oblon, McClelland, Maier & Neustadt, L.L.P.

(57) ABSTRACT

An underwater welding apparatus includes: an underwater welding head provided underwater and having, at its leading end, a nozzle section from which laser light is emitted; a shied cover formed of an elastic member and provided around the nozzle section so as to form, at the leading end of the underwater welding head, a space where water is excluded by shield gas; and an expansion/contraction member having a discharge hole for discharging water and shield gas containing metal dust particles from an inside of the shield cover, the discharge hole being increased in diameter (Continued)

as pressure inside the shield cover rises, while being reduced in diameter as the pressure inside the shield cover falls.

3 Claims, 7 Drawing Sheets

(58) Field of Classification Search
USPC .................. 219/74, 121.63, 121.67, 121.84
See application file for complete search history.

(56) References Cited

U.S. PATENT DOCUMENTS

| | | | | |
|---|---|---|---|---|
| 3,648,015 A * | 3/1972 | Fairbairn | ............... | H05H 1/30 219/121.24 |
| 3,949,911 A * | 4/1976 | Morane | ............... | B65D 83/62 222/386.5 |
| 4,029,095 A * | 6/1977 | Pena | ............... | A61H 35/04 604/30 |
| 4,087,670 A * | 5/1978 | Miller | ............... | B23K 10/00 219/121.39 |
| 4,102,342 A * | 7/1978 | Akiyama | ............... | A61M 25/1018 251/1.2 |
| 4,114,659 A * | 9/1978 | Goldberg | ............... | B01L 3/021 141/26 |
| 4,151,393 A * | 4/1979 | Fenneman | ............... | B23K 26/142 219/121.6 |
| 4,154,999 A | 5/1979 | Pinfold et al. | | |
| 4,172,974 A | 10/1979 | Stingelin et al. | | |
| 4,475,026 A * | 10/1984 | Schloerb | ............... | B23K 9/202 219/72 |
| 4,482,246 A * | 11/1984 | Meyer | ............... | G01N 21/73 219/121.48 |
| 4,657,085 A * | 4/1987 | Jacobsen | ............... | A62C 37/14 169/38 |
| 4,801,292 A * | 1/1989 | Watson | ............... | A61M 3/0229 604/185 |
| 5,811,055 A * | 9/1998 | Geiger | ............... | B23K 9/0061 266/48 |
| 5,852,271 A * | 12/1998 | Offer | ............... | B23K 26/122 219/72 |
| 5,935,954 A | 8/1999 | Onuma et al. | | |
| 5,938,954 A * | 8/1999 | Onuma | ............... | B23K 26/122 219/121.6 |
| 5,961,856 A | 10/1999 | Fusaro, Jr. et al. | | |
| 5,977,515 A * | 11/1999 | Uraki | ............... | B23K 26/067 219/121.6 |
| 6,167,925 B1 * | 1/2001 | D'Andrade | ............... | F41B 9/0012 141/348 |
| 6,179,613 B1 * | 1/2001 | Yang | ............... | A61C 1/0084 433/80 |
| 6,435,844 B1 * | 8/2002 | Fukami | ............... | F04B 43/0054 417/395 |
| 6,555,779 B1 * | 4/2003 | Obana | ............... | B23K 9/0061 219/121.63 |
| 7,164,094 B2 * | 1/2007 | Offer | ............... | B23K 20/10 219/76.1 |
| 7,759,601 B2 * | 7/2010 | Tamura | ............... | B23K 26/02 219/121.63 |
| 9,327,810 B2 * | 5/2016 | Zediker | ............... | B63G 8/001 |
| 2002/0092837 A1 * | 7/2002 | Keats | ............... | B23K 9/28 219/142 |
| 2002/0195429 A1 * | 12/2002 | Fusaro, Jr. | ............... | B23K 9/0061 219/74 |
| 2009/0124161 A1 * | 5/2009 | Barish | ............... | F41B 9/004 446/15 |
| 2010/0065532 A1 * | 3/2010 | Champney | ............... | B23K 9/0061 219/74 |
| 2010/0108645 A1 * | 5/2010 | Viard | ............... | B23K 9/0061 219/74 |
| 2011/0073111 A1 * | 3/2011 | Stone | ............... | B63C 11/186 128/205.24 |
| 2011/0212482 A1 * | 9/2011 | Jangam | ............... | A61B 5/150022 435/29 |

FOREIGN PATENT DOCUMENTS

| | | |
|---|---|---|
| JP | 56 141965 | 11/1981 |
| JP | 59-96313 U | 6/1984 |
| JP | 2000 56070 | 2/2000 |
| JP | 3006370 | 2/2000 |

OTHER PUBLICATIONS

Extended European Search Report dated Dec. 4, 2015 in European Patent Application No. 12826236.7.

* cited by examiner

UNDERWATER WELDING APPARATUS AND UNDERWATER WELDING METHOD

TECHNICAL FIELD

Embodiments described herein relate generally to an underwater welding apparatus and method for performing underwater welding of, e.g., an in-reactor structure provided in reactor water of a nuclear reactor.

BACKGROUND ART

There is conventionally known, as an underwater welding apparatus that performs underwater welding, an underwater welding apparatus that performs underwater repair for an in-reactor structure provided in reactor water of a nuclear reactor. Such an underwater welding apparatus needs to be configured to form underwater, at least around a welding pool, a space where water is excluded by means of gas during welding. Thus, various methods have been proposed to ensure a partial shield for forming the space where water is excluded around the welding pool.

For example, in an underwater machining apparatus described in Patent Document 1, when a material 1 to be processed as a material to be welded provided in an underwater environment is welded as illustrated in FIG. 7, a TIG welding power supply 2 is installed in the atmosphere, and only a welding torch 4 which is a welding head from which an arc 3 is generated is installed underwater. In this state, shield gas 6 is used to locally exclude water (welding part is shielded) so as to prevent the welding torch 4 and welding part 5 from contacting the water.

Moreover, the underwater machining apparatus described in Patent Document 1 uses, as a shield means for excluding the water, a combination of a highly elastic shield cover (solid wall) 7 made of a felt-like cloth woven from carbon fibers each having a thickness of about 5 mm and Ar gas.

PRIOR ART DOCUMENTS

Patent Documents

Patent Document 1: Japanese Patent No. 3,006,370

SUMMARY OF THE INVENTION

Problems to be Solved by the Invention

However, in a case where continuous build-up welding of a groove is performed underwater on a cylindrical body such as a nozzle, the shield cover 7 used as the shield means described in Patent Document 1 may be turned up, resulting in introduction of the water into an inside (hereinafter, referred to as "chamber") of the shield cover 7.

At installation time of the machining apparatus, the water is collected inside the shield cover 7. When the water is introduced into the chamber of the shield cover 7, the introduced water is mainly discharged from a pushing surface of the shield cover 7 by internal pressure of inert gas filled in the chamber 7.

However, the water cannot be discharged completely, depending on attitude of the welding torch 4 serving as the welding head. For example, this may occur when the welding torch 4 is in an upward-facing attitude or laterally-facing attitude. This causes some of the water to be left behind in the chamber. To cope with such a case, it is necessary to provide a check valve or the like so as to discharge the residual water.

By the way, metal dust particles (hereinafter, sometimes referred to as "fume") each having a diameter of several μm to several tens of μm are generated. Particularly, in laser welding, a significant amount of fume is generated. When this fume is mixed with the water, it becomes a clayey substance having high viscosity, and this clayey substance may adhere to the valve seat of the check valve or an inside of a flow channel, impeding functions thereof.

An object of the embodiments of the present invention is to provide an underwater welding apparatus and method capable of preventing the water outside the shield cover from being introduced and reliably and easily discharging the water and shield gas containing metal dust particles introduced inside the shield cover.

Means for Solving the Problem

In order to achieve the above-mentioned object, according to an embodiment, there is provided an underwater welding apparatus comprising: an underwater welding head provided underwater and having, at its leading end, a nozzle section from which laser light is emitted; a shield cover formed of an elastic member and provided around the nozzle section so as to form, at the leading end of the underwater welding head, a space where water is excluded by means of shield gas; and an expansion/contraction member having a discharge hole for discharging water and shield gas containing metal dust particles from an inside of the shield cover, the discharge hole being increased in diameter as pressure inside the shield cover rises, while being reduced in diameter as the pressure inside the shield cover falls.

Furthermore in order to achieve the above-mentioned object, according to an embodiment, there is provided an underwater welding method that provides an underwater welding head underwater and performs underwater welding of a part to be welded of a structure, the method comprising the steps of: forming, at a leading end side of the underwater welding head, a space where water is excluded by means of shield gas by using a shield cover formed of an elastic member and provided around a nozzle section from which laser light is emitted and which is provided at the leading end side of the underwater welding head; and discharging water and the shield gas containing metal dust particles inside the shield cover through a discharge hole of an expansion/contraction member, the discharge hole being increased in diameter as pressure inside the shield cover rises, while being reduced in diameter as the pressure inside the shield cover falls.

Advantage of the Invention

According to the embodiments of the present invention, it is possible to prevent the water outside the shield cover from being introduced and reliably and easily discharge the water and shield gas containing metal dust particles introduced inside the shield cover.

EMBODIMENTS FOR CARRYING OUT THE INVENTION

Embodiments of an underwater welding machine according to the present invention will be described below with reference to the drawings.

First Embodiment

Figure 1:
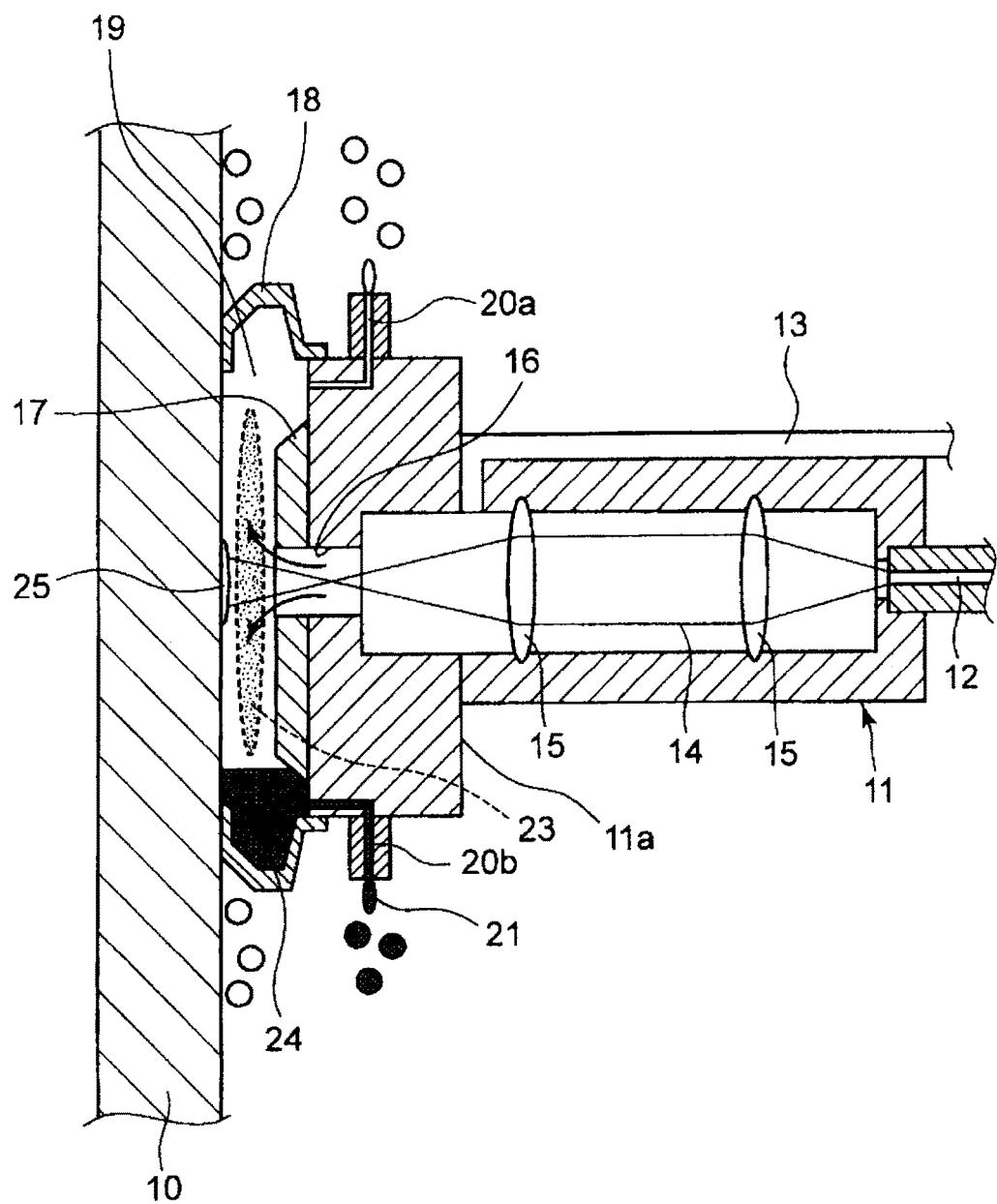
FIG. 1 is an elevational cross-sectional view illustrating a first embodiment of an underwater welding apparatus according to the present invention.
Figure 2:
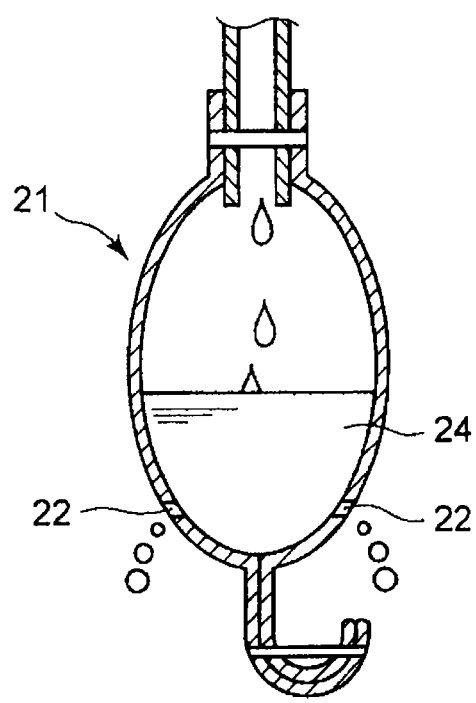
FIG. 2 is an enlarged cross-sectional view illustrating an expansion/contraction valve of FIG. 1.
Figure 3:
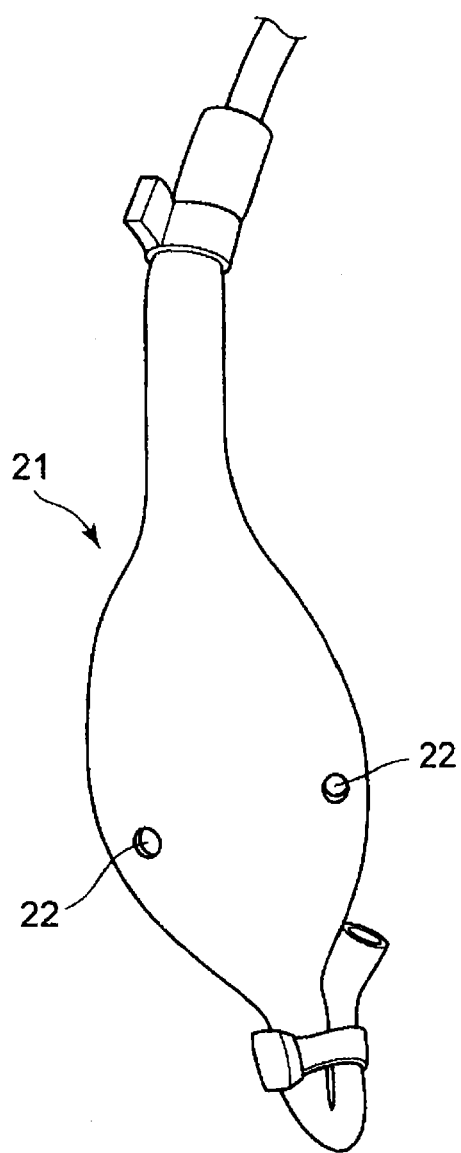
FIG. 3 is an enlarged perspective view illustrating the expansion/contraction valve of FIG. 1.

FIG. 1 is an elevational cross-sectional view illustrating a first embodiment of an underwater welding apparatus according to the present invention. FIG. 2 is an enlarged cross-sectional view illustrating an expansion/contraction valve of FIG. 1. FIG. 3 is an enlarged perspective view illustrating the expansion/contraction valve of FIG. 1.

In the present embodiment, when a material 10 to be welded provided in an underwater environment as illustrated in FIG. 1 is welded, a not illustrated laser oscillator is installed in the atmosphere, and only an underwater welding head 11 is installed underwater. Laser light emitted from the laser oscillator provided in the atmosphere is transmitted to the underwater welding head 11 through an optical fiber 12. At the same time, inert gas serving as shield gas is supplied from a not illustrated shield gas supply source provided in the atmosphere to the underwater welding head 11 through an inert gas inlet 13.

The underwater welding head 11 is formed into substantially a cylindrical shape. Inside the underwater welding head 11, there is provided an optical system 15 for collecting laser light 14. At a leading end side (left side of FIG. 1) of the underwater welding head 11, there is provided a large diameter portion 11a protruding in a flange-like manner toward an outer peripheral direction. At substantially center portion of the large diameter portion 11a, there is provided a nozzle section 16 for emitting the laser light 14 collected by the optical system 15 and ejecting the inert gas.

On a leading end side surface of the large diameter portion 11a, there is provided a reflected light absorber 17 for absorbing reflected light of the laser light 14 so as to surround the nozzle section 16. In the present embodiment, the reflected light absorber 17 is formed of a plate-like member formed into an annular shape and is firmly fixed to the large diameter portion 11a. For example, as the plate-like member forming the reflected light absorber 17, a carbon plate can suitably be used.

Around the reflected light absorber 17, a shield cover 18 for forming, around a welding part, a space where the water is excluded by means of shield gas is provided so as to extend from a leading end outer peripheral surface of the large diameter portion 11a. Inside the shield cover 18, there is formed a chamber 19 in which the inert gas is filled. As the shield cover 18, a silicon rubber which is an elastic member having a comparatively small thickness is preferably used. The use of such a member can ensure waterproof properties and deformation performance.

Inside the large diameter portion 11a, discharge routes 20a and 20b are formed up and down. Through the discharge routes 20a and 20b, the water introduced inside the chamber 19 is discharged. An expansion/contraction valve 21 as an expansion/contraction member is connected to the discharge route 20b formed at the lower portion of the large diameter portion 11a.

The expansion/contraction valve 21 is formed into a spindle-shaped bag obtained by closing one side of a rubber tube, as illustrated in FIGS. 2 and 3. The expansion/contraction valve 21 can expand and contract as a whole in accordance with pressure in the chamber 19. Specifically, the expansion/contraction valve 21 expands as the pressure inside the chamber 19 rises and contracts as the pressure inside the chamber 19 falls. The expansion/contraction valve 21 has, at its side surface, valve discharge holes 22 and 22, through which water 24 and gas containing fume 23 are discharged.

Since the expansion/contraction valve 21 can expand and contract as a whole, the valve discharge holes 22 and 22 are each increased and reduced in its diameter in accordance with the pressure inside the chamber 19. Specifically, the diameter of each of the valve discharge holes 22 and 22 is increased as the pressure inside the chamber 19 rises and reduced as the pressure inside the chamber 19 falls.

The following describes operation of the present embodiment.

In the underwater welding apparatus having the above configuration, the laser light 14 transmitted to the underwater welding head 11 through the optical fiber 12 is collected by the optical system 15 provided inside the underwater welding head 11 and emitted from the nozzle section 16 toward the material 10 to be welded. At the same time, a not illustrated welding wire is supplied, and a welding pool 25 is formed in the material 10 to be welded, whereby welding work is executed.

During the welding work, a part of the laser light 14 emitted from the nozzle section 16 to the material 10 to be welded is reflected at the material 10 to be welded and its neighboring portion to be reflected light. In the underwater welding apparatus according to the present embodiment, the reflected light absorber 17 for absorbing the reflected light is provided at a leading end side (left side of FIG. 1) portion of the underwater welding head 11 to be irradiated with the reflected light, so that a large proportion of the reflected light is absorbed by the reflected light absorber 17, which can significantly reduce a possibility that the reflected light is further reflected to reach the shield cover 18.

In the present embodiment, when the water 24 is introduced inside the chamber 19, the water 24 is collected inside the shield cover 18 in a mixed state with the fume 23 generated inside the chamber 19.

At this time, the inert gas is filled in the chamber 19, so that the water 24 collected inside the chamber 19 is passed through the discharge route 20b formed in the large diameter portion 11a and then discharged through the valve discharge hole 22 formed in the expansion/contraction valve 21.

When the water 24 containing the fume 23 is discharged through the valve discharge hole 22, the fume 23 is deposited in the valve discharge hole 22 to clog the valve discharge hole 22. When the valve discharge hole 22 is clogged, the expansion/contraction valve 21 expands due to increase in the internal pressure in the chamber 19 to increase the diameter of the valve discharge hole 22, with the result that the water 24 is discharged. At this time, the internal pressure in the chamber 19 is increased, so that external water is not introduced even if the diameter of the valve discharge hole 22 is increased.

As described above, according to the present embodiment, the expansion/contraction valve 21 expands and contracts in accordance with the internal pressure in the chamber 19 to thereby prevent the fume 23 from being deposited in the valve discharge hole 22 and prevent introduction of the exterior water.

Second Embodiment

Figure 4:
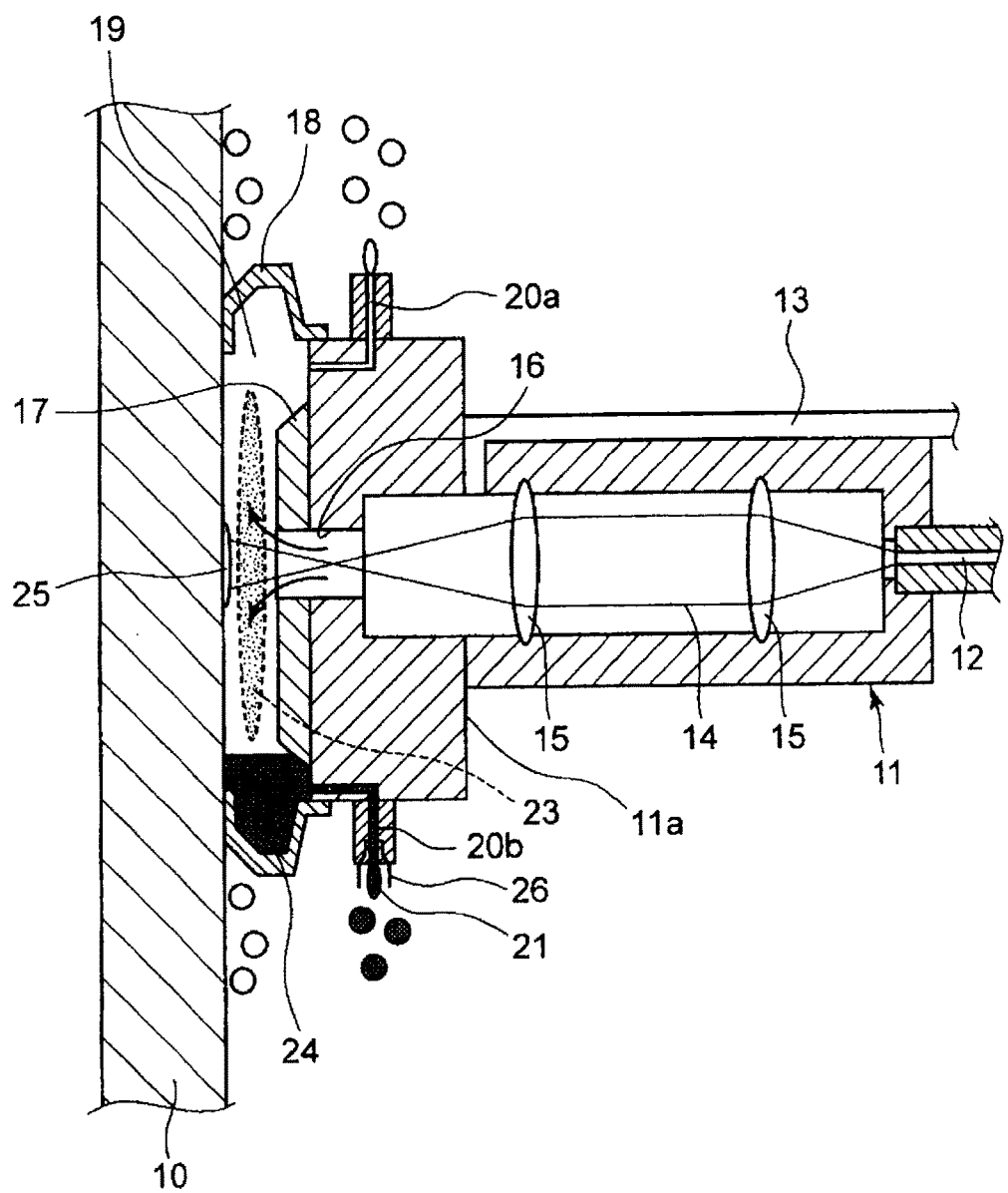
FIG. 4 is an elevational cross-sectional view illustrating a second embodiment of the underwater welding apparatus according to the present invention.
Figure 5:
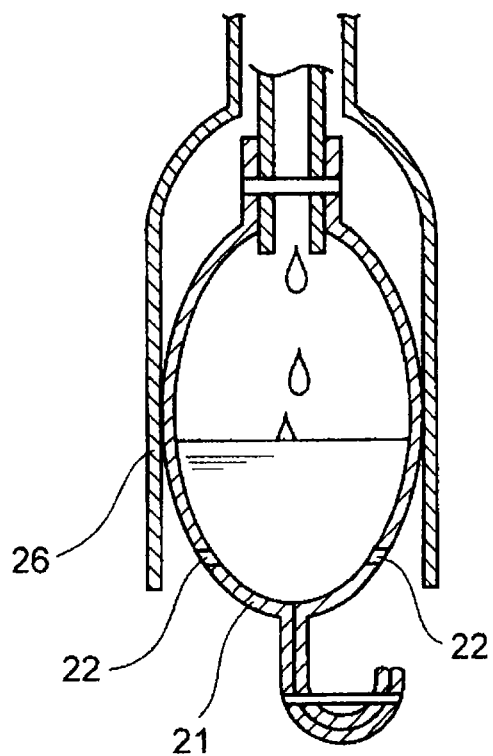
FIG. 5 is an enlarged cross-sectional view illustrating the expansion/contraction valve and a protective tube which are illustrated in FIG. 4.

FIG. 4 is an elevational cross-sectional view illustrating a second embodiment of the underwater welding apparatus according to the present invention. FIG. 5 is an enlarged cross-sectional view illustrating the expansion/contraction valve and a protective tube which are illustrated in FIG. 4. In FIGS. 4 and 5, the same reference numerals are given to the same or corresponding parts of the first embodiment, and redundant explanations thereof will be omitted. The same is applied to a third embodiment to be described later.

As illustrated in FIGS. 4 and 5, in the present embodiment, a protective tube 26 is provided around the expansion/contraction valve 21. The protective tube 26 is formed of a metal and disposed so as to surround the expansion/contraction valve 21 formed into a spindle-shape. A lower end of the protective tube 26 extends up to near the valve discharge hole 22 of the expansion/contraction valve 21. Thus, when the expansion/contraction valve 21 expands as the internal pressure in the chamber 19 rises, the valve discharge hole 22 is exposed from the protective tube 26. As a result, the diameter of the valve discharge hole 22 can be increased in accordance with the internal pressure in the chamber 19.

As described above, according to the present embodiment, the protective tube 26 is provided around the expansion/contraction valve 21, which can prevent rupture of the expansion/contraction valve 21 even if the valve discharge hole 22 is clogged with deposition of the fume 23 to cause the expansion/contraction valve 21 to expand due to excessive rise in the internal pressure.

Third Embodiment

Figure 6:
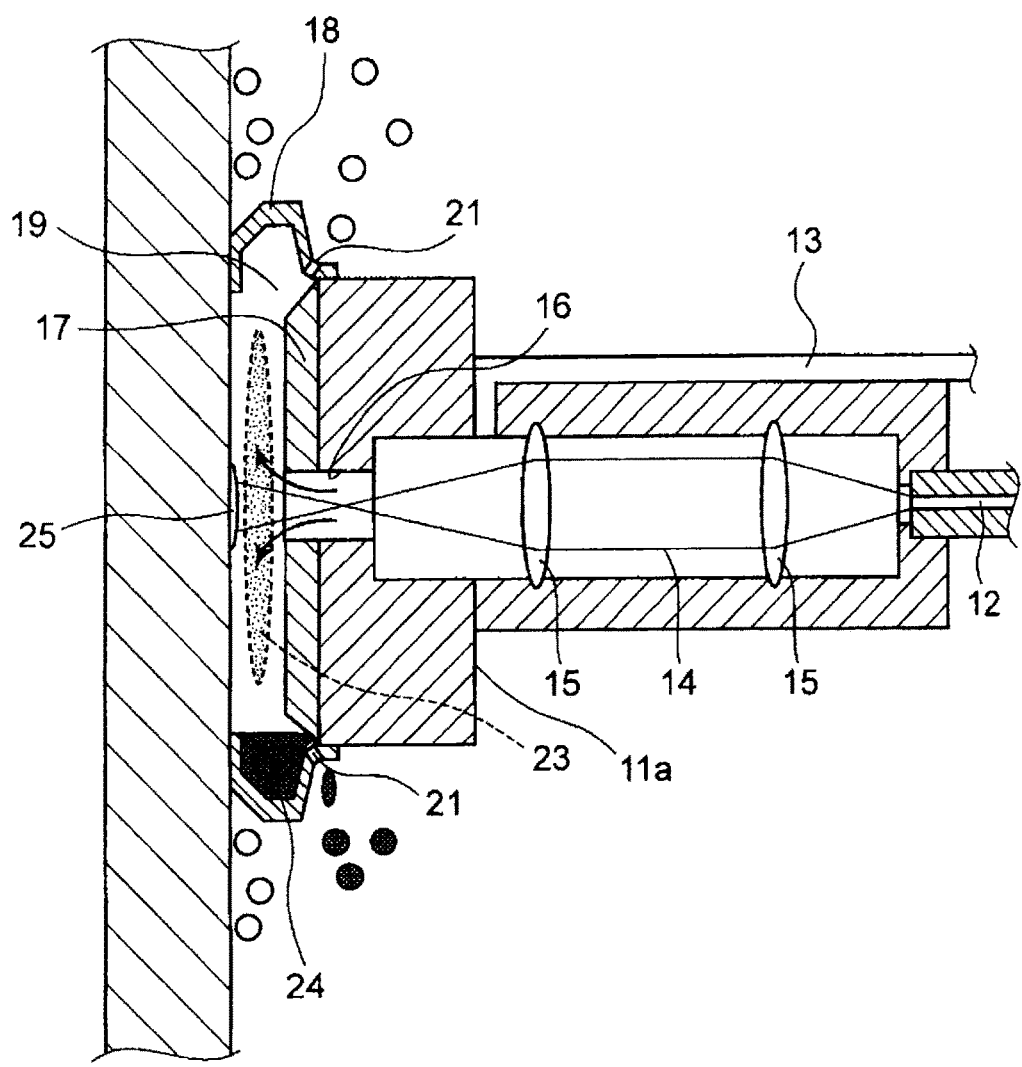
FIG. 6 is an elevational cross-sectional view of a third embodiment of the underwater welding apparatus according to the present invention.
Figure 7:
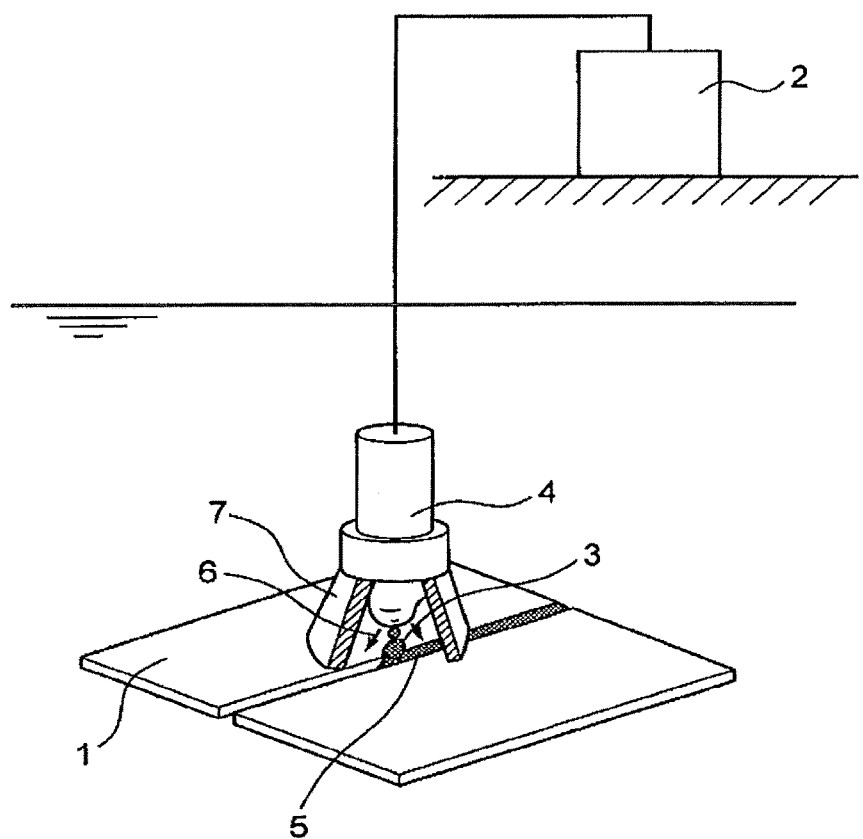
FIG. 7 is an entire configuration view of a conventional underwater welding apparatus.

FIG. 6 is an elevational cross-sectional view of a third embodiment of the underwater welding apparatus according to the present invention. As illustrated in FIG. 6, in the present embodiment, a plurality of the expansion/contraction valves 21 are attached directly to the shield cover 18 by adhesive so as to be spaced at regular intervals along a circumferential direction of the shield cover 18. Each of the expansion/contraction valves 21 according to the present embodiment is formed of an elastic member having a thickness smaller than a thickness of the shield cover 18 and thus expands faster than the shield cover 18 when the internal pressure excessively rises.

As described above, according to the present embodiment, the expansion/contraction valve 21 is directly attached to the shield cover 18, thereby eliminating the need to form the discharge routes 20a and 20b in the large diameter portion 11a, which can simplify a structure of the underwater welding head 11.

Although the preferred embodiments of the present invention have been described above, the embodiments are merely illustrative and do not limit the scope of the present invention. These novel embodiments can be practiced in other various forms, and various omissions, substitutions and changes may be made without departing from the scope of the invention. The embodiments and modifications thereof are included in the scope or spirit of the present invention and in the appended claims and their equivalents.

For example, in the above respective embodiments, the expansion/contraction valve 21 is formed of rubber; however, any other material can be used as long as the expansion/contraction valve 21 can expand and contract in accordance with the internal pressure in the chamber 19 and the diameter of the valve discharge hole 22 can be increased and reduced in accordance with the expansion and contraction.

EXPLANATION OF THE SYMBOLS

10: Material to be welded
11: Underwater welding head
11a: Large diameter portion
12: Optical fiber
13: Inert gas inlet
14: Laser light
15: Optical system
16: Nozzle section
17: Reflected light absorber
18: Shield cover
19: Chamber
20a, 20b: Discharge route
21: Expansion/contraction valve (expansion/contraction member)
22: Valve discharge hole
23: Fume
24: Water
25: Welding pool
26: Protective tube

What is claimed is:

1. An underwater welding apparatus comprising:
an underwater welding head provided underwater and having, at a leading end of the underwater welding head, a nozzle section from which a laser light is emitted;
a flange protruding toward an outer peripheral direction at the leading end of the underwater welding head, and having the nozzle section;
an elastic shield cover and provided around the nozzle section so as to form, at the leading end of the underwater welding head, a space where water is excluded by means of shield gas; and
an expansion/contraction valve having, at a side surface of the expansion/contraction valve, a discharge hole for discharging the water and the shield gas containing metal dust particles from an inside of the elastic shield cover, the expansion/contraction valve including a rubber tube being formed into a bag obtained by closing one side of the rubber tube, and being connected to inside the elastic shield cover through a discharge route which is formed in the flange of the underwater welding head, wherein
the discharge hole is configured to increase in diameter as pressure inside the elastic shield cover rises when the discharge hole is clogged, and to reduce in diameter as the pressure inside the elastic shield cover falls, and
when the pressure inside the elastic shield cover falls, the water collected inside the elastic shield cover is passed through the discharge route formed in the flange and then discharged through the discharge hole formed in the expansion/contraction valve.

2. The underwater welding apparatus according to claim 1, wherein the expansion/contraction valve comprises the rubber tube being an elastic rubber tube and a protective tube surrounding the elastic rubber tube.

3. An underwater welding method that provides an underwater welding head underwater and performs underwater welding of a part to be welded of a structure, the method comprising steps of:

forming, at a leading end side of the underwater welding head, a space where water is excluded by means of shield gas by using an elastic shield cover and provided around a nozzle section from which a laser light is emitted and which is provided at the leading end side of the underwater welding head; and discharging the water and the shield gas containing metal dust particles inside the elastic shield cover through a discharge hole at side surface of an expansion/contraction valve being formed into a bag obtained by closing one side of a rubber tube, and being connected to inside the elastic shield cover through a discharge route which is formed in a flange of the underwater welding head, wherein the discharge hole is configured to increase in diameter as pressure inside the elastic shield cover rises when the discharge hole is clogged, and to reduce in diameter as the pressure inside the elastic shield cover falls, and when the pressure inside the elastic shield cover falls, the water collected inside the elastic shield cover is passed through the discharge route formed in the flange and then discharged through the discharge hole formed in the expansion/contraction valve.

* * * * *